United States Patent
Miura et al.

(12)

(10) Patent No.: US 6,858,351 B2
(45) Date of Patent: Feb. 22, 2005

(54) POLYETHYLENE OXIDE-BASED ELECTROLYTE CONTAINING SILICON COMPOUND

(75) Inventors: Katsuhito Miura, Osaka (JP); Shouhei Matsui, Osaka (JP); Seiji Nakamura, Osaka (JP); Yoshihiko Wada, Osaka (JP)

(73) Assignee: Daiso Co., Ltd., Osaka (JP)

( * ) Notice: Subject to any disclaimer, the term of this patent is extended or adjusted under 35 U.S.C. 154(b) by 139 days.

(21) Appl. No.: 10/289,405

(22) Filed: Nov. 7, 2002

(65) Prior Publication Data
US 2003/0124432 A1 Jul. 3, 2003

(30) Foreign Application Priority Data
Nov. 7, 2001 (JP) .................................. P2001-341802

(51) Int. Cl.[7] .................. H01M 6/18; H01G 00/00; B32B 9/04
(52) U.S. Cl. .................. 429/317; 429/313; 252/62.2; 428/447
(58) Field of Search .................. 429/313, 376, 429/317, 306, 309, 321; 252/62.2, 510, 183.13, 182.3; 524/261, 266, 273; 528/32, 33, 34, 35; 523/526; 96/14; 428/447, 451

(56) References Cited

U.S. PATENT DOCUMENTS

| 4,818,644 A | 4/1989 | Armand |
| 6,239,204 B1 * | 5/2001 | Miura et al. ................ 524/401 |

FOREIGN PATENT DOCUMENTS

| JP | 62-169823 | | 7/1987 | |
| JP | 62-249361 | | 10/1987 | |
| JP | 63-154736 | | 6/1988 | |
| JP | 02-215836 | * | 8/1990 | ........... C08G/77/46 |
| JP | 9-324114 | | 12/1997 | |

* cited by examiner

Primary Examiner—Raymond Alejandro
(74) Attorney, Agent, or Firm—Wenderoth, Lind & Ponack, L.L.P.

(57) ABSTRACT

An electrolyte composition, which contains (1) a polymer having an ether linkage optionally having a crosslinkable functional group, (2) an additive containing an organic silicon compound having an ethylene oxide unit, and (3) an electrolyte salt compound, is excellent in mechanical properties and ionic conductivity.

15 Claims, No Drawings

POLYETHYLENE OXIDE-BASED ELECTROLYTE CONTAINING SILICON COMPOUND

FIELD OF THE INVENTION

The present invention relates to an electrolyte composition comprising a polymeric compound, an additive and an electrolyte salt compound. More particularly, the present invention relates to an electrolyte composition which is suitable as a material for an electrochemical device such as a battery, a capacitor and a sensor.

RELATED ARTS

As an electrolyte constituting an electrochemical device such as a battery, a capacitor and a sensor, those in the form of a solution or a paste have hitherto been used in view of the ionic conductivity. However, the following problems are pointed out. There is a fear of damage of an apparatus arising due to liquid leakage, and subminiaturization and thinning of the device are limited because a separator to be impregnated with an electrolyte solution is required. To the contrary, a solid electrolyte such as an inorganic crystalline substance, inorganic glass, and an organic polymer substance is suggested. The organic polymer substance is generally superior in processability and moldability and the resulting solid electrolyte has good flexibility and bending processability and, furthermore, the design freedom of the device to be applied is high and, therefore, the development thereof is expected. However, the organic polymer substance is inferior in ionic conductivity to other materials at present.

The discovery of ionic conductivity in a homopolymer of ethylene oxide and an alkaline metal system causes the active researches of a polymer solid electrolyte. Consequently, it is believed that a polyether such as polyethylene oxide is promising in view of high mobility and solubility of metal cation. It is expected that the ion migrates in an amorphous portion of the polymer other than a crystalline portion of the polymer. In order to decrease the crystallinity of polyethylene oxide, various epoxides are copolymerized with ethylene oxide. JP-A-62-249361 discloses a solid electrolyte comprising a copolymer of ethylene oxide and propylene oxide, and U.S. Pat. No. 4,818,644 discloses a solid electrolyte comprising a copolymer of ethylene oxide and methyl glycidyl ether. However, these solid electrolytes do not always have satisfactory ionic conductivity.

JP-A-9-324114 filed by the present applicant proposes that an attempt to use a polymer solid electrolyte in which a specified alkaline metal salt is incorporated into a diethyleneglycolmethyl glycidyl ether/ethylene oxide copolymer. However, this electrolyte cannot give a practically sufficient value of conductivity.

SUMMARY OF THE INVENTION

An object of the present invention is to provide an electrolyte composition excellent in mechanical properties and ionic conductivity.

The present invention provides an electrolyte composition comprising (1) a polymer having an ether linkage optionally having a crosslinkable functional group, (2) an additive containing an organic silicon compound having an ethylene oxide unit, and (3) an electrolyte salt compound, wherein the ether linkage-containing polymer (1) is selected from the group consisting of
(1-1) a copolymer comprising a structural unit represented by the following formula (i) and a structural unit represented by the following formula (ii), and
(1-2) a copolymer comprising the structural unit (i), the structural unit (ii) and a crosslinkable structural unit represented by the following formula (iii); and the additive comprising the organic silicon compound having the ethylene-oxide unit (2) is selected from the group of organic silicon compounds having the ethylene oxide unit represented by the following formulas (iv), (v) and (vi):

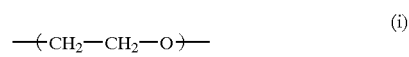

(i)

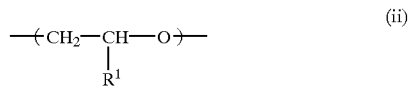

(ii)

wherein $R^1$ is an alkyl group, $-CH_2-O-(-CH_2-CH_2-O-)_n-CH_3$ or $-CH_2-O-CH[(-CH_2-CH_2-O-)_n-CH_3]_2$ (n is an integer of 0 to 12),

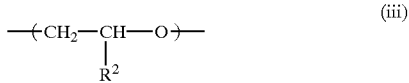

(iii)

wherein $R^2$ is a functional group having a reactive functional group,

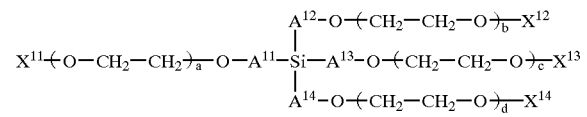

(iv)

wherein $A^{11}$, $A^{12}$, $A^{13}$ and $A^{14}$ are, the same or different, $-(-CH_2-)_p-$ (p is an integer of 0 to 3);
$X^{11}$, $X^{12}$, $X^{13}$ and $X^{14}$ are, the same or different, a methyl group, an ethyl group, a propyl group or a butyl group; and
a, b, c and d are an integer of 1 to 50,

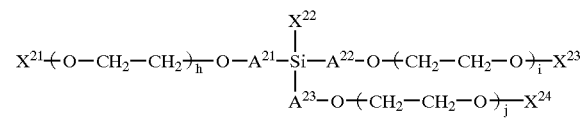

(v)

wherein $A^{21}$, $A^{22}$ and $A^{23}$ are, the same or different, $-(-CH_2-)_p-$ (provided that p is an integer of 0 to 3);
$X^{21}$, $X^{22}$, $X^{23}$ and $X^{24}$ are, the same or different, a methyl group, an ethyl group, a propyl group or a butyl group; and
h, i and j are an integer of 1 to 50,

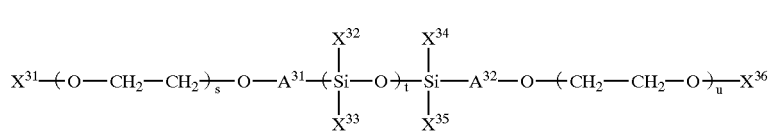

(vi)

wherein $A^{31}$ and $A^{32}$ are, the same or different, $—(—CH_2)_p—$ (provided that p is an integer of 0 to 3); $X^{31}, X^{32}, X^{33}, X^{34}, X^{35}$ and $X^{36}$ are, the same or different, a methyl group, an ethyl group, a propyl group or a butyl group; and s and u are an integer of 1 to 50, t is an integer of 0 to 10, t<s and t<u.

The present invention further provides an electrolyte composition comprising (1) a crosslinked polymer prepared by crosslinking the polymer having the ether linkage, (2) the additive comprising the organic silicon compound having the ethylene oxide unit, and (3) the electrolyte salt compound.

Additionally, the present invention provides a battery comprising the above-mentioned electrolyte composition.

DETAILED DESCRIPTION OF THE INVENTION

The crosslinked material of the electrolyte composition can be used when the shape stability is necessary at a high temperature.

The present inventors also discovered a high performance battery having a low internal resistance when the electrolyte composition of the present invention is used. The electrolyte composition of the present invention may be a gel. The term "gel" means a polymer which is swelled with a solvent such as water and an organic solvent.

The polymer having the ether linkage (1) is preferably
(1-1) a copolymer comprising a structural unit of the following formula (i) and a structural unit of the following formula (ii), or
(1-2) a copolymer comprising the structural unit (i), the structural unit (ii) and a crosslinkable structural unit of the following formula (iii).

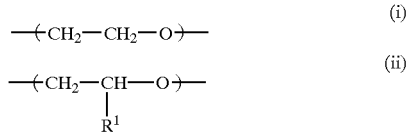

wherein $R^1$ is an alkyl group (for example, $C_1$–$C_{20}$, preferably $C_1$–$C_{10}$, more preferably $C_1$–$C_3$ alkyl group), $—CH_2—O—(—CH_2—CH_2—O—)_n—CH_3$ or $—CH_2—O—CH[(—CH_2—CH_2—O—)_n—CH_3]_2$ (n is such a integer that $0 \leq n \leq 12$),

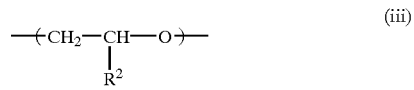

wherein $R^2$ is a functional group having a reactive functional group.

The monomer constituting the structural unit (i) in the polymer (1) is ethylene oxide.

The oxirane compound constituting the structural unit (ii) in the polymer (1) includes a glycidyl ether compound and an alkylene oxide optionally having a substituent group. Specific examples are an oxirane compound such as propylene oxide, methyl glycidyl ether, butyl glycidyl ether, styrene oxide, phenyl glycidyl ether and 1,2-epoxyhexane; ethyleneglycolmethyl glycidyl ether, diethyleneglycolmethyl glycidyl ether, triethyleneglycolmethyl glycidyl ether, 1,3-bis(2-methoxyethoxy)propane-2-glycidyl ether and 1,3-bis[2-(2-methoxyethoxy)ethoxy]propane-2-glycidyl ether.

The reactive functional group in the oxirane compound forming the crosslinkable structural unit (iii) in the polymer (1) is preferably (a) a reactive silicon group, (b) a methyl-epoxy group, (c) an ethylenically unsaturated group, or (d) a halogen atom.

Examples of the oxirane compound having the reactive silicon group (a) include 2-glycidoxyethyltrimethoxysilane, 3-glycidoxypropylmethyldimethoxysilane, 3-glycidoxypropyltrimethoxysilane, 4-glycidoxybutylmethyltrimethoxysilane, 3-(1,2-epoxy)propyltrimethoxysilane, 4-(1,2-epoxy)butyltrimethoxysilane, 5-(1,2-epoxy)pentyltrimethoxysilane, 1-(3,4-epoxycyclohexyl)methylmethyldimethoxysilane and 2-(3,4-epoxycyclohexyl)ethyltrimethoxysilane. Among them, 3-glycidoxypropyltrimethoxysilane and 3-glycidoxypropylmethyldimethoxysilane are preferable.

Examples of the oxirane compound having the methyl-epoxy group (b) include 2,3-epoxypropyl-2',3'-epoxy-2'-methylpropyl ether, ethylene glycol-2,3-epoxypropyl-2',3'-epoxy-2'-methylpropyl ether, diethylene glycol-2,3-epoxypropyl-2',3'-epoxy-2'-methylpropyl ether, 2-methyl-1,2,3,4-diepoxybutane, 2-methyl-1,2,4,5-diepoxypentane, 2-methyl-1,2,5,6-diepoxyhexane, hydroquinone-2,3-epoxypropyl-2',3'-epoxy-2'-methylpropyl ether, and catechol-2,3-epoxypropyl-2',3'-epoxy-2'-methylpropyl ether. Among them, 2,3-epoxypropyl-2',3'-epoxy-2'-methylpropyl ether and ethylene glycol-2,3-epoxypropyl-2',3'-epoxy-2'-methylpropyl ether are preferable.

Examples of the oxirane compound having the ethylenically unsaturated group (c) include allyl glycidyl ether, 4-vinylcyclohexyl glycidyl ether, α-terpinyl glycidyl ether, cyclohexenylmethyl glycidyl ether, p-vinylbenzyl glycidyl ether, allylphenyl glycidyl ether, vinyl glycidyl ether, 3,4-epoxy-1-butene, 3,4-epoxy-1-pentene, 4,5-epoxy-2-pentene, 1,2-epoxy-5,9-cyclododecadiene, 3,4-epoxy-1-vinylcyclohexene, 1,2-epoxy-5-cyclooctene, glycidyl acrylate, glycidyl methacrylate, glycidyl sorbinate, glycidyl cinnamate, glycidyl crotonate and glycidyl 4-hexenoate. Allyl glycidyl ether, glycidyl acrylate and glycidyl methacrylate are preferable.

Examples of the oxirane compound having the halogen atom (d) include epibromohydrin, epiiodohydrin and epichlorohydrin.

The polymerization method of the polymer having the ether linkage is a polymerization method for preparing a copolymer by a ring-opening reaction of ethylene oxide moiety, and can be conducted in the same manner as in JP-A-63-154736 and JP-A-62-169823 filed by the present applicant.

The polymerization reaction can be conducted as follows. The polyether copolymer can be obtained by reacting the respective monomers at the reaction temperature of 10 to 80° C. under stirring, using a catalyst mainly containing an organoaluminum, a catalyst mainly containing an organozinc, an organotin-phosphate ester condensate catalyst and the like as a ring opening polymerization catalyst in the presence or absence of a solvent. The organotin-phosphate ester condensate catalyst is particularly preferable in view of the polymerization degree or properties of the resulting copolymer. In the polymerization reaction, the reaction functional group does not react and a copolymer having the reaction functional group is obtained.

The amount of the ethylene oxide constituting the structural unit (i) may be from 10 to 95 parts by weight, preferably from 20 to 90 parts by weight, the amount of the oxirane compound constituting the structural unit (ii) may be from 90 to 5 parts by weight, preferably 80 to 10 parts by weight, the amount of the oxirane compound constituting the crosslinkable structural unit (iii) may be from 0 to 30 parts by weight, preferably from 0 to 20 parts by weight, based on the polymer having the ether linkage used in the electrolyte composition of the present invention.

When the amount of the oxirane compound constituting the crosslinkable structural unit (iii) is at most 30 parts by weight, the crosslinked polymer has excellent ionic conductivity.

When the amount of ethylene oxide constituting the structural unit (i) is at least 10 parts by weight, the electrolyte salt compound can be easily dissolved even at a low temperature so that the ionic conductivity is high.

It is generally known that the decrease of the glass transition temperature improves the ionic conductivity, and it was found that the improvement effect of the ionic conductivity is remarkably high in the case of the electrolyte composition of the present invention.

As the molecular weight of the polymer used in the electrolyte composition, the weight-average molecular weight is suitably within the range from $10^4$ to $10^7$, preferably from $10^5$ to $5 \times 10^6$, so as to obtain excellent processability, moldability, mechanical strength and flexibility.

In the crosslinking method of the copolymer (1) wherein the reactive functional group is the reactive silicon group (a), the crosslinking can be conducted by the reaction between the reactive silicon group and water. In order to enhance the reactivity, there may be used, as a catalyst, organometal compounds, for example, tin compounds such as dibutyltin dilaurate and dibutyltin maleate; titanium compounds such as tetrabutyl titanate and tetrapropyl titanate; aluminum compounds such as aluminum trisacetyl acetonate and aluminum trisethyl acetoacetate; or amine compounds such as butylamine and octylamine.

In the crosslinking method of the copolymer (1) wherein the reactive functional group is the methylepoxy group (b), for example, polyamines and acid anhydrides can be used.

Examples of the polyamines include aliphatic polyamines such as diethylenetriamine and dipropylenetriamine; and aromatic polyamines such as 4,4'-diamino diphenyl ether, diamino diphenyl sulfone, m-phenylenediamine and xylylenediamine. The amount of the polyamine varies depending on the type of the polyamine, but is normally within the range from 0.1 to 10 parts by weight, based on 100 parts by weight of the electrolyte composition excluding a plasticizer (i.e., the additive (2)).

Examples of the acid anhydrides includes maleic anhydride, phthalic anhydride, methylhexahydrophthalic anhydride, tetramethylenemaleic anhydride and tetrahydrophthalic anhydride. The amount of the acid anhydrides varies depending on the type of the acid anhydride, but is normally within the range from 0.1 to 10 parts by weight, based on 100 parts by weight of the electrolyte composition excluding the plasticizer.

In the crosslinking, an accelerator can be used. In the crosslinking reaction of polyamines, examples of the accelerator include phenol, cresol and resorcin. In the crosslinking reaction of the acid anhydride, examples of the accelerator include benzyldimethylamine, 2-(dimethylaminoethyl)phenol and dimethylaniline. The amount of the accelerator varies depending on the type of the accelerator, but is normally within the range from 0.1 to 10 parts by weight, based on 100 parts by weight of the crosslinking agent.

In the crosslinking method of the copolymer (1) wherein the reactive functional group is the ethylenically unsaturated group (c), a radical initiator selected from an organic peroxide, an azo compound and the like, or active energy ray such as ultraviolet ray and electron ray is used. It is also possible to use a crosslinking agent having silicon hydride.

As the organic peroxide, there can be used those which are normally used in the crosslinking, such as ketone peroxide, peroxy ketal, hydroperoxide, dialkyl peroxide, diacyl peroxide and peroxy ester. Specific examples thereof include 1,1-bis(t-butylperoxy)-3,3,5-trimethylcyclohexane, di-t-butyl peroxide, t-butylcumyl peroxide, dicumyl peroxide, 2,5-dimethyl-2,5-di(t-butylperoxy)hexane and benzoylperoxide. The amount of the organic peroxide varies depending on the type of the organic peroxide, but it is normally within the range from 0.1 to 10 parts by weight, based on 100 parts by weight of the electrolyte composition excluding the plasticizer.

As the azo compound, there can be used those which are normally used in the crosslinking, such as an azonitrile compound, an azoamide compound and an azoamidine compound, and specific examples thereof include 2,2'-azobisisobutyronitrile, 2,2'-azobis(2-methylbutyronitrile), 2,2'-azobis(4-methoxy-2,4-dimethylvaleronitrile), 2,2-azobis(2-methyl-N-phenylpropionamidine)dihydrochloride, 2,2'-azobis[2-(2-imidazolin-2-yl)propane], 2,2'-azobis[2-methyl-N-(2-hydroxyethyl)propionamide], 2,2'-azobis(2-methylpropane) and 2,2'-azobis[2-(hydroxymethyl)propionitrile]. The amount of the azo compound varies depending on the type of the azo compound, but is normally within the range from 0.1 to 10 parts by weight, based on 100 parts by weight of the electrolyte composition excluding the plasticizer.

In the crosslinking due to radiation of activated energy ray such as ultraviolet ray, glycidyl acrylate ether, glycidyl methacrylate ether and glycidyl cinnamate ether are particularly preferable. Furthermore, as an auxiliary sensitizer, there can be optionally used acetophenones such as diethoxyacetophenone, 2-hydroxy-2-methyl-1-phenylpropan-1-one and phenylketone; benzoin; benzoin ethers such as benzoin methyl ether; benzophenones such as benzophenone and 4-phenylbenzophenone; thioxanthones such as 2-isopropylthioxanthone and 2,4-dimethylthioxanthone; and azides such as 3-sulfonylazidobenzoic acid and 4-sulfonylazidobenzoic acid.

As a crosslinking aid, there can be optionally used ethylene glycol diacrylate, ethylene glycol dimethacrylate, oligoethylene glycol diacrylate, oligoethylene glycol dimethacrylate, allyl methacrylate, allyl acrylate, diallyl maleate, triallyl isocyanurate, bisphenylmaleimide and maleic anhydride.

As the compound having silicon hydride, which is used for crosslinking the ethylenically unsaturated group (c), a compound having at least two silicon hydrides are used. Particularly, a polysiloxane compound or a polysilane compound is preferable.

Examples of the polysiloxane compound include a linear polysiloxane compound represented by the formula (a-1) or (a-2), or a cyclic polysiloxane compound represented by the formula (a-3).

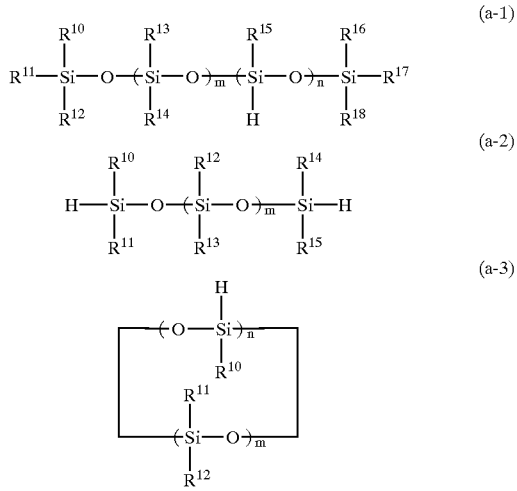

In the formulas (a-1) to (a-3), $R^{10}$, $R^{11}$, $R^{12}$, $R^{13}$, $R^{14}$, $R^{15}$, $R^{16}$, $R^{17}$ and $R^{18}$ respectively represent a hydrogen atom or an alkyl or alkoxy group having 1 to 12 carbon atoms; and $n \geq 2$, $m \geq 0$, $2 \leq n+m \leq 300$ (m and n are an integer). As the alkyl group, a lower alkyl group such as a methyl group, an ethyl group, a propyl group and a butyl group is preferable. As the alkoxy group, a lower alkoxy group such as a methoxy group, an ethoxy group, a propoxy group and a butyl group is preferable.

As the polysilane compound, a linear polysilane compound represented by the formula (b-1) can be used.

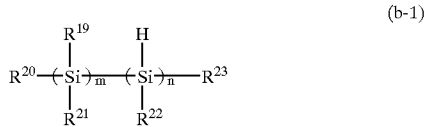

In the formula (b-1), $R^{19}$, $R^{20}$, $R^{21}$, $R^{22}$ and $R^{23}$ respectively represent a hydrogen atom or an alkyl or alkoxy group having 1 to 12 carbon atoms; and $n \geq 2$, $m \geq 0$, $2 \leq m+n \leq 100$ (m and n are an integer).

Examples of the catalyst for the hydrosilylation reaction include transition metals such as palladium and platinum or a compound or complex thereof. Furthermore, a peroxide, an amine and a phosphine can also be used. The most popular catalyst includes dichlorobis(acetonitrile)palladium (II), chlorotris(triphenylphosphine)rhodium(I) and chloroplatinic acid.

In the crosslinking method of the copolymer (1) wherein the reactive functional group is the halogen atom (d), for example, a crosslinking agent such as polyamines, mercaptoimidazolines, mercaptopyrimidines, thioureas and polymercaptanes can be used. Examples of the polyamines include triethylenetetramine and hexamethylenediamine. Examples of the mercaptoimidazolines include 2-mercaptoimidazoline and 4-methyl-2-mercaptoimidazoline. Examples of the mercaptopyrimidines include 2-mercaptopyrimidine and 4,6-dimethyl-2-mercaptopyrimidine. Examples of the thioureas include ethylene thiourea and dibutyl thiourea. Examples of the polymercaptanes include 2-dibutylamino-4,6-dimethylcapto-s-triazine and 2-phenylamino-4,6-dimercaptotriazine. The amount of the crosslinking agent varies depending on the type of the crosslinking agent, but is normally within the range from 0.1 to 30 parts by weight, based on 100 parts by weight of the electrolyte composition excluding the plasticizer.

Furthermore, it is effective to add a metal compound as an acid acceptor to the polymer solid electrolyte in view of the thermal stability of the halogen-containing polymer. Examples of the metal compound as the acid acceptor include oxide, hydroxide, carbonate, carboxylate, silicate, borate, and phosphite of Group II metals of the Periodic Table; and oxide, basic carbonate, basic carboxylate, basic phosphite, basic sulfite, or tribasic sulfate of Group VIa metals of the Periodic Table. Specific examples thereof include magnesia, magnesium hydroxide, magnesium carbonate, calcium silicate, calcium stearate, read lead and tin stearate. The amount of the metal compound as the above acid acceptor varies depending on the type thereof, but is normally within the range from 0.1 to 30 parts by weight, based on 100 parts by weight of the electrolyte composition excluding the plasticizer.

The additive (2) comprising the organic silicon compound acts as the plasticizer. When the additive comprising the organic silicon compound having the ethylene oxide unit is added to the electrolyte composition, the crystallization of the polymer is prevented, the glass transition temperature is decreased and many amorphous phases are formed even at a low temperature to give excellent ionic conductivity.

The organic silicon compound may be a compound free of a silicon-oxygen linkage (siloxane linkage) or a compound having a silicon-oxygen linkage (siloxane linkage). In the compound free of the siloxane linkage, the number of silicon atoms may be 1. In the compound having the siloxane linkage, the number of silicon atoms may be 1 or from 2 to 11. The organic silicon compound has at least 4 molecular terminals and all of the molecular terminals may be a methyl group.

Examples of the organic silicon compound having the ethylene oxide unit are preferably the organic silicon compounds having the ethylene unit represented by the following formulas (iv), (v) and (vi).

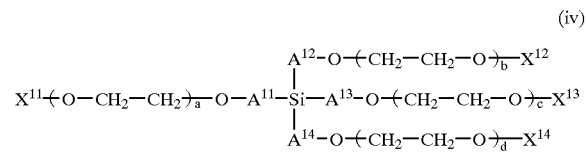

wherein $A^{11}$, $A^{12}$, $A^{13}$ and $A^{14}$ are, the same or different, —(—$CH_2$)$_p$— (p is an integer of 0 to 3); $X^{11}$, $X^{12}$, $X^{13}$ and $X^{14}$ are, the same or different, a methyl group, an ethyl group, a propyl group or a butyl group; and a, b, c and d are an integer of 1 to 50, preferably 1 to 10,

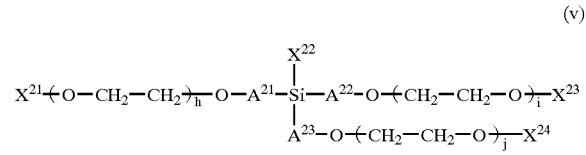

wherein $A^{21}$, $A^{22}$ and $A^{23}$ are, the same or different, —(—$CH_2$)$_p$— (p is an integer of 0 to 3); $X^{21}$, $X^{22}$, $X^{23}$ and $X^{24}$ are, the same or different, a methyl group, an ethyl group, a propyl group or a butyl group; and h, i and j are an integer of 1 to 50, preferably 1 to 10,

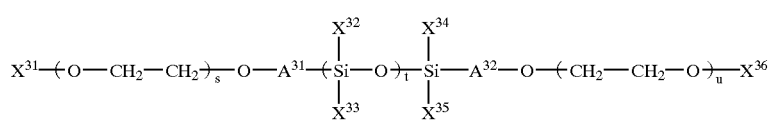

(vi)

wherein $A^{31}$ and $A^{32}$ are, the same or different, —(—CH$_2$)$_p$— (p is an integer of 0 to 3); $X^{31}$, $X^{32}$, $X^{33}$, $X^{34}$, $X^{35}$ and $X^{36}$ are, the same or different, a methyl group, an ethyl group, a propyl group or a butyl group; and s and u are an integer of 1 to 50, preferably 1 to 10, t is an integer of 0 to 10, preferably 0 to 5, t<s and t<u.

The amount of the additive (2) is arbitrary, and may be from 5 to 2,000 parts by weight, preferably from 20 to 1,000 parts by weight, based on 100 parts by weight of the polymer (1).

The electrolyte salt compound (3) used in the present invention is preferably soluble in a mixture comprising an uncrosslinked or crosslinked material of the polymer (1) and the plasticizer (2). In the present invention, the following salt compounds are preferably used.

That is, examples thereof include a compound composed of a cation selected from a metal cation, ammonium ion, amidinium ion and guanidium ion, and an anion selected from chlorine ion, bromine ion, iodine ion, perchlorate ion, thiocyanate ion, tetrafluoroborate ion, nitrate ion, AsF$_6^-$, PF$_6^-$, stearylsulfonate ion, octylsulfonate ion, dodecylbenzenesulfonate ion, naphthalenesufonate ion, dodecylnaphthalenesulfonate ion, 7,7,8,8-tetracyano-p-quinodimethane ion, $X^1SO_3^-$, [($X^1SO_2$)($X^2SO_2$)N]$^-$, [($X^1SO_2$)($X^2SO_2$)($X^3SO_2$)C]$^-$ and [($X^1SO_2$)($X^2SO_2$)YC]$^-$, wherein $X^1$, $X^2$, $X^3$ and Y respectively represent an electron attractive group. Preferably, $X^1$, $X^2$ and $X^3$ independently represent a petfluoroalkyl or perfluoroaryl group having 1 to 6 carbon atoms and Y represents a nitro group, a nitroso group, a carbonyl group, a carboxyl group or a cyano group. $X^1$, $X^2$ and $X^3$ may be the same or different. As the metal cation, a cation of a transition metal can be used. Preferably, a cation of a metal selected from Mn, Fe, Co, Ni, Cu, Zn and Ag metals is used. When using a cation of a metal selected from Li, Na, K, Rb, Cs, Mg, Ca and Ba metals, good results are also obtained. Two or more compounds described above may be used as the electrolyte salt compound. A lithium salt compound is a preferable electrolyte salt compound in a lithium ion battery.

In the present invention, the amount of the electrolyte salt compound (3) is preferably from 1 to 50 parts by weight, more preferably 3 to 20 parts by weight, based on 100 parts by weight of the polymer (1). When this value is at most 50 parts by weight, the processability and moldability, and the mechanical strength and flexibility of the resulting solid electrolyte are high, and, furthermore, ionic conductivity is also high.

A flame retardant can be used when the flame retardance is required in the case that the electrolyte composition is used. An effective amount of those selected from halide such as a brominated epoxy compound, tetrabromobisphenol A and a chlorinated paraffin, antimony trioxide, antimony pentaoxide, aluminum hydroxide, magnesium hydroxide, phosphate ester, polyphosphate salt and zinc borate can be added as the flame retardant.

The method for production of the electrolyte composition of the present invention is not specifically limited, and usually respective components may be mechanically mixed. In the case of the polymer (1) requiring the crosslink, the electrolyte composition can be prepared, for example, by a method of crosslinking the copolymer after mechanically mixing the respective components, or a method of crosslinking the copolymer, followed by immersing the copolymer in the plasticizer for a long time to perform the impregnation. As means for mechanically mixing, various kneaders, open roll, extruder, etc. can be optionally used.

In case that the reactive functional group is a reactive silicon group, the amount of water used in the crosslinking reaction is not specifically limited because the crosslinking reaction easily occurs even in the presence of moisture in an atmosphere. The crosslinking can also be performed by passing through a cold water or hot water bath for a short time, or exposing to a steam atmosphere.

In case of the copolymer wherein the reactive functional group is an ethylenically unsaturated group, when using a radical initiator, the crosslinking reaction is completed at the temperature of 10° C. to 200° C. within 1 minutes to 20 hours. Furthermore, when using energy ray such as ultraviolet ray, a sensitizer is generally used. The crosslinking reaction is normally completed at the temperature of 10° C. to 150° C. within 0.1 second to 1 hour. In case of the crosslinking agent having silicon hydride, the crosslinking reaction is completed at the temperature of 10° C. to 180° C. within 10 minutes to 10 hours.

A method of mixing the electrolyte salt compound (3) and the additive (2) with the polymer (1) (that is, the polyether copolymer) is not specifically limited. Examples of said method include a method of immersing the polyether copolymer in an organic solvent containing the electrolyte salt compound and the additive for a long time to perform the impregnation; a method of mechanically mixing the electrolyte salt compound and the additive with the polyether copolymer; a method of dissolving the polyether copolymer and the electrolyte salt compound in the additive to give a mixture; and a method of dissolving the polyether copolymer in another organic solvent and then mixing the solution with the additive. In the production using a solvent, various polar solvents such as tetrahydrofuran, acetone, acetonitrile, dimethylformamide, dimethyl sulfoxide, dioxane, methyl ethyl ketone and methyl isobutyl ketone may be used alone or in combination thereof.

The electrolyte composition of the present invention is superior in mechanical strength and flexibility, and a large area thin-film shaped solid electrolyte can be easily obtained by utilizing the properties of the electrolyte composition. For example, it is possible to make a battery by using the electrolyte composition of the present invention. In this case, examples of a positive electrode material include lithium-manganese double oxide, lithium cobaltate, vanadium pentaoxide, olivin-type iron phosphate, polyacetylene, polypyrene, polyaniline, polyphenylene, polyphenylene sulfide, polyphenylene oxide, polypyrrole, polyfuran, and polyazulene. Examples of a negative electrode material include an interlaminar compound prepared by occlusion of lithium between graphite or carbon layers, a lithium metal and a lithium-lead alloy. By utilizing high ion conductivity, the electrolyte composition can also be used as a diaphragm of an ion electrode of a cation such as alkaline metal ion, Cu ion, Ca ion, and Mg ion. The electrolyte composition of the present invention is particularly suitable as a material for electrochemical device such as a battery, a capacitor and a sensor.

PREFERRED EMBODIMENTS OF THE INVENTION

The following Examples further illustrate the present invention.

The composition in terms of monomer of the polyether copolymer was determined by $^1$H NMR spectrum. In case of the measurement of the molecular weight of the polyether copolymer, a gel permeation chromatography measurement was conducted and the molecular weight was calculated in terms of standard polystyrene. The gel permeation chromatography measurement was conducted at 60° C. by a measuring device RID-6A manufactured by Shimadzu Corp., using a column manufactured by Showa Denko such as Showdex KD-807, KD-806, KD-806M and KD-803, and dimethylformamide (DMF) as a solvent. The glass transition temperature and the fusion heat were measured in a nitrogen atmosphere within the temperature range from −100 to 80° C. at a heating rate of 10° C./min., using a differential scanning calorimeter DSC-8230B manufactured by Rigaku Denki Co., Ltd. For the measurement of the electrical conductivity σ, a sample film was previously vacuum-dried at 30° C. for 12 hours. The electrical conductivity was measured at 10° C. with sandwiched between stainless steel electrodes, and the conductivity was calculated according to the complex impedance method, using an A.C. method (voltage: 0.5 V, frequency: 5 Hz to 1 MHz).

PREPARATION EXAMPLE

Production of Catalyst

Tributyltin chloride (10 g) and tributyl phosphate (35 g) were charged in a three-necked flask equipped with a stirrer, a thermometer and a distillation device, and the mixture was heated at 250° C. for 20 minutes while stirring under a nitrogen stream and the distillate was distilled off to obtain a solid condensate as a residue product. In the following, this condensate was used as a polymerization catalyst.

POLYMERIZATION EXAMPLE 1

Preparation of Polymer

After the atmosphere in a four-necked glass flask (internal volume: 3 L) was replaced by nitrogen, the condensate (2 g) obtained in the above Preparation Example as a catalyst, an oxirane compound (EM-3) (140 g) having a water content adjusted to not more than 10 ppm and represented by the following formula (11) and n-hexane (1,000 g) as a solvent were charged in the flask. Ethylene oxide (70 g) was gradually added with monitoring the polymerization degree of EM-3 by gas chromatography. The polymerization reaction was terminated by using methanol. The polymer was isolated by decantation, dried at 40° C. under a normal pressure for 24 hours, and then dried at 45° C. under reduced pressure for 10 hours to give 200 g of a polymer. This copolymer had the glass transition temperature of −73° C., the weight-average molecular weight of 1,400,000 and the fusion heat of 3 J/g. $^1$H NMR spectrum analysis revealed that the composition in terms of monomer of this copolymer had ethylene oxide of 30 wt % and EM-3 of 70 wt %.

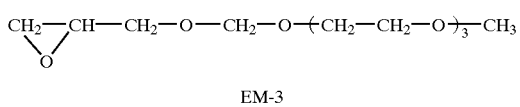

EM-3

(11)

POLYMERIZATION EXAMPLE 2

Preparation of Polymer

After the atmosphere in a four-necked glass flask (internal volume: 3 L) was replaced by nitrogen, the condensate (2 g) obtained in the above Preparation Example as a catalyst, an oxirane compound (GM) (100 g) having a water content adjusted to not more than 10 ppm and represented by the following formula (12), allyl glycidyl ether (10 g) and n-hexane (1,000 g) as a solvent were charged in the flask. Ethylene oxide (120 g) was gradually added with monitoring the polymerization degree of GM by gas chromatography. The polymerization reaction was terminated by using methanol. The polymer was isolated by decantation, dried at 40° C. under a normal pressure for 24 hours, and then dried at 45° C. under reduced pressure for 10 hours to give 205 g of a polymer. This copolymer had the glass transition temperature of −74° C., the weight-average molecular weight of 1,150,000 and the fusion heat of 3 J/g. $^1$H NMR spectrum analysis revealed that the composition in terms of monomer of this copolymer had ethylene oxide of 53 wt %, GM of 43 wt % and allyl glycidyl ether of 4 wt %.

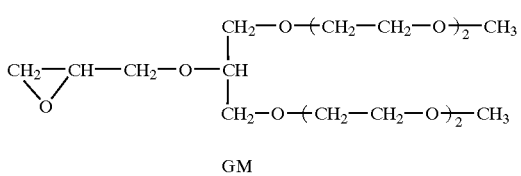

GM (12)

POLYMERIZATION EXAMPLE 3

Preparation of Polymer

After the atmosphere in a four-necked glass flask (internal volume: 3 L) was replaced by nitrogen, the condensate (2 g) obtained in the above Preparation Example as a catalyst, an oxirane compound (EM-2) (110 g) having a water content adjusted to not more than 10 ppm and represented by the following formula (13), glycidyl methacrylate (18 g) and n-hexane (1,000 g) as a solvent were charged in the flask. Ethylene oxide (90 g) was gradually added with monitoring the polymerization degree of EM-2 by gas chromatography. The polymerization reaction was terminated by using methanol. The polymer was isolated by decantation, dried at 40° C. under a normal pressure for 24 hours, and then dried at 45° C. under reduced pressure for 10 hours to give 200 g of a polymer. This copolymer had the glass transition temperature of −71° C., the weight-average molecular weight of 1,050,000 and the fusion heat of 5 J/g. $^1$H NMR spectrum analysis revealed that the composition in terms of monomer of this copolymer had ethylene oxide of 43 wt %, EM-2 of 50 wt % and glycidyl methacrylate of 7 wt %.

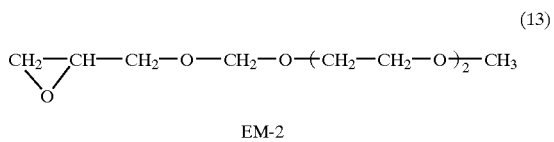

EM-2

EXAMPLE 1

1 g of the polymer obtained in Polymerization Example 1, 0.5 g of the additive having siloxane linkage represented by the following formula (14), and 0.7 g of lithium bis(trifluoromethylsulphonyl)imide (LiTFSI) as a lithium salt compound were mixed with 50 g of acetonitrile to give a homogeneous mixture, and then the mixture was uniformly coated on a PET film. The coating was dried at a reduced pressure at 30° C. for 12 hours to give a film having a thickness of 50 μm. The film had the ionic conductivity of $4.3 \times 10^{-4}$ S/cm.

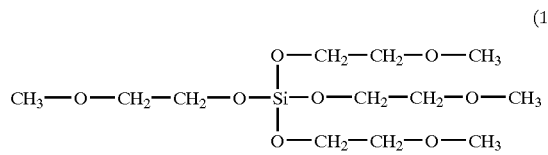

EXAMPLE 2

1 g of the polymer obtained in Polymerization Example 2, 1 g of the additive having siloxane linkage represented by the following formula (15), 0.7 g of lithium bis(trifluoromethylsulphonyl)imide (LiTFSI) as a lithium salt compound, 0.015 g of benzoyl peroxide as an initiator and 0.3 g of ethyleneglycol diacrylate as a crosslinking aid were mixed with 50 g of acetonitrile to give a homogeneous mixture and then the mixture was uniformly coated on a PET film. The coating was dried at a reduced pressure at 30° C. for 12 hours and heated at 100° C. for 2 hours under nitrogen atmosphere to give a crosslinked film having a thickness of 50 μm. The film had the ionic conductivity of $2.1 \times 10^{-4}$ S/cm.

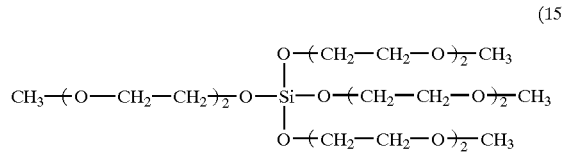

EXAMPLE 3

1 g of the polymer obtained in Polymerization Example 3, 0.5 g of the additive having siloxane linkage represented by the following formula (16), 0.6 g of lithium bis(trifluoromethylsulphonyl)imide (LiTFSI) as a lithium salt compound, and 0.015 g of benzoyl peroxide as an initiator were mixed with 50 g of acetonitrile to give a homogeneous mixture and then the mixture was uniformly coated on a PET film. The coating was dried at a reduced pressure at 30° C. for 12 hours and heated at 100° C. for 2 hours under nitrogen atmosphere to give a crosslinked film having a thickness of 50 μm. The film had the ionic conductivity of $8.2 \times 10^{-5}$ S/cm.

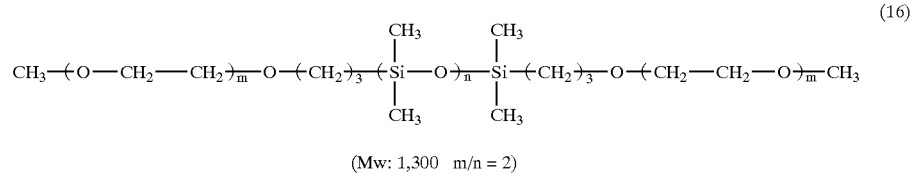

(Mw: 1,300 m/n = 2)

EXAMPLE 4

1 g of an ethylene oxide/propylene oxide/glycidyl methacrylate terpolymer (ethylene oxide: 80 wt %, propylene oxide: 15 wt %, glycidyl methacrylate: 5 wt %) having the weight-average molecular weight of 700,000, 2 g of the additive having siloxane linkage represented by the following formula (17), 0.7 g of lithium bis(trifluoromethylsulphonyl)imide (LiTFSI) as a lithium salt compound, 0.015 g of benzoyl peroxide as an initiator and 0.3 g of ethyleneglycol diacrylate as a crosslinking aid were mixed with 50 g of acetonitrile to give a homogeneous mixture and then the mixture was uniformly coated on a PET film. The coating was dried at a reduced pressure at 30° C. for 12 hours and heated at 100° C. for 2 hours under nitrogen atmosphere to give a crosslinked film having a thickness of 50 μm. The film had the ionic conductivity of $1.0 \times 10^{-4}$ S/cm.

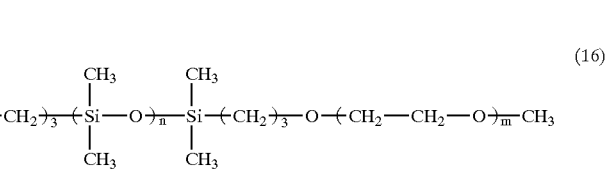

Comparative Example 1

A film was formed in the same manner as in Example 1 except that the additive having siloxane linkage was not used. The ionic conductivity was $1.2 \times 10^{-5}$ S/cm.

Comparative Example 2

A film was formed in the same manner as in Example 2 except that the additive having siloxane linkage was not used. The ionic conductivity was $2.1 \times 10^{-5}$ S/cm.

Comparative Example 3

A film was formed in the same manner as in Example 3 except that the additive having siloxane linkage was not used. The ionic conductivity was $1.6\times10^{-5}$ S/cm.

Comparative Example 4

A film was formed in the same manner as in Example 4 except that the additive having siloxane linkage was not used. The ionic conductivity was $6.2\times10^{-6}$ S/cm.

EXAMPLE 5

By using the polymer solid electrolyte obtained in Example 2 as an electrolyte, a lithium metal foil as a negative electrode and lithium cobaltate (LiCoO$_2$) as a positive electrode active material, a secondary battery was prepared. The size of the polymer solid electrolyte was 10 mm×10 mm×0.05 mm. The size of the lithium foil was 10 mm×10 mm×0.1 mm. Lithium cobaltate was prepared by mixing predetermined amounts of lithium carbonate and cobalt carbonate powder and then calcining the mixture at 900° C. for 5 hours. The calcined mixture was ground, and then 5 parts by weight of acetylene black, 10 parts by weight of the polymer obtained in Polymerization Example 2, and 5 parts by weight of lithium bis(trifluoromethylsulphonyl) imide (LiTFSI) were added to 85 parts by weight of resultant lithium cobaltate, mixed with rolls and press molded under a pressure of 30 MPa to give a film having the size of 10 mm×10 mm×0.2 mm which was a positive electrode of the battery.

The polymer solid electrolyte obtained in Example 2 was sandwiched between the lithium metal foil and the positive electrode plate, and the charge/discharge characteristics of the resulting battery were examined at 25° C. with applying a pressure of 1 MPa so that the interfaces were brought into contact with each other. The discharge current at the initial terminal voltage of 3.8 V was 0.1 mA/cm$^2$ and the electrical charging could be conducted at 0.1 mA/cm$^2$. It is possible to easily reduce the thickness of the battery in this Example and, therefore, a light-weight and large-capacity battery can be obtained.

EXAMPLE 6

By using the polymer solid electrolyte obtained in Example 3 as an electrolyte, a lithium metal foil as a negative electrode and lithium cobaltate (LiCoO$_2$) as a positive electrode active material, a secondary battery was prepared. The size of the polymer solid electrolyte was 10 mm×10 mm×0.05 mm. The size of the lithium foil was 10 mm×10 mm×0.1 mm. Lithium cobaltate was prepared by mixing predetermined amounts of lithium carbonate and cobalt carbonate powder and then calcining the mixture at 900° C. for 5 hours. The calcined mixture was ground, and then 5 parts by weight of acetylene black, 10 parts by weight of the polymer obtained in Polymerization Example 3 and 5 parts by weight of lithium bis(trifluoromethylsulphonyl) imide (LiTFSI) were added to 85 parts by weight of resultant lithium cobaltate, mixed with rolls and press molded under a pressure of 30 MPa to give a film having the size of 10 mm×10 mm×0.2 mm which was a positive electrode of the battery.

The polymer solid electrolyte obtained in Example 3 was sandwiched between the lithium metal foil and the positive electrode plate, and the charge/discharge characteristics of the resulting battery were examined at 25° C. with applying a pressure of 1 MPa so that the interfaces were brought into contact with each other. The discharge current at the initial terminal voltage of 3.8 V was 0.1 mA/cm$^2$ and the electrical charging could be conducted at 0.1 mA/cm$^2$. It is possible to easily reduce the thickness of the battery in this Example and, therefore, a light-weight and large-capacity battery can be obtained.

EXAMPLE 7

By using the polymer solid electrolyte obtained in Example 4 as an electrolyte, a lithium metal foil as a negative electrode and lithium cobaltate (LiCoO$_2$) as a positive electrode active material, a secondary battery was prepared. The size of the polymer solid electrolyte was 10 mm×10 mm×0.05 mm. The size of the lithium foil was 10 mm×10 mm×0.1 mm. Lithium cobaltate was prepared by mixing predetermined amounts of lithium carbonate and cobalt carbonate powder and then calcining the mixture at 900° C. for 5 hours. The calcined mixture was ground, and then 5 parts by weight of acetylene black, 10 parts by weight of the polymer obtained in Polymerization Example 3, 5 parts by weight of lithium bis(trifluoromethylsulphonyl) imide (LiTFSI) and 5 parts by weight of the siloxane compound of the formula (17) were added to 85 parts by weight of resultant lithium cobaltate, mixed with rolls and press molded under a pressure of 30 MPa to give a film having the size of 10 mm×10 mm×0.2 mm which was a positive electrode of the battery.

The polymer solid electrolyte obtained in Example 4 was sandwiched between the lithium metal foil and the positive electrode plate, and the charge/discharge characteristics of the resulting battery were examined at 25° C. with applying a pressure of 1 MPa so that the interfaces were brought into contact with each other. The discharge current at the initial terminal voltage of 3.8 V was 0.1 mA/cm$^2$ and the electrical charging could be conducted at 0.1 MA/cm$^2$. It is possible to easily reduce the thickness of the battery in this Example and, therefore, a light-weight and large-capacity battery can be obtained.

EFFECT OF THE INVENTION

The polymer solid electrolyte of the present invention is superior in processability, moldability, mechanical strength, flexibility, heat resistance and the like and the ionic conductivity is remarkably improved. Accordingly, it can be applied to electronic apparatuses such as a large-capacity condenser and a display device (e.g., an electrochromic display), and to anti-static agents and materials for a rubber and plastics, in addition to solid batteries (particularly, secondary batteries).

What is claimed is:

1. An electrolyte composition comprising (1) a polymer having an ether linkage optionally having a crosslinkable functional group, (2) an additive comprising an organic silicon compound having an ethylene oxide unit, and (3) an electrolyte salt compound, wherein the ether linkage-containing polymer (1) is selected from the group consisting of (1-1) a copolymer comprising a structural unit represented by the following formula (i) and a structural unit represented by the following formula (ii), and (1-2) a copolymer comprising the structural unit (i), the structural unit (ii) and a crosslinkable structural unit represented by the following formula (iii); and the additive comprising the organic silicon compound having the ethylene oxide unit (2) is selected from the group of organic silicon compounds having the ethylene oxide unit represented by the following formulas (iv), (v) and (vi):

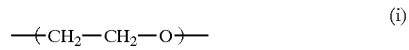  (i)

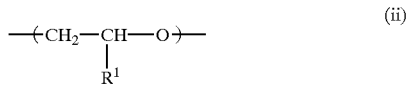  (ii)

wherein $R^1$ is an alkyl group, $-CH_2-O-(-CH_2-CH_2-O-)_n-CH_3$ or $-CH_2-O-CH[(-CH_2-CH_2-O-)_n-CH_3]_2$ and n is an integer of 0 to 12,

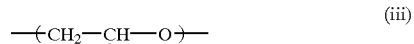  (iii)

wherein $R^2$ is a functional group having a reactive functional group,

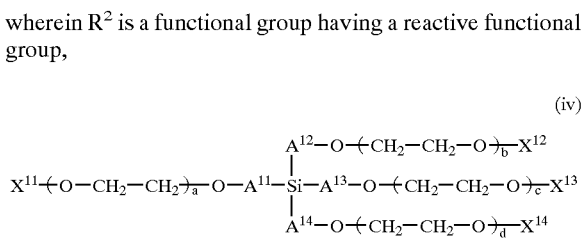  (iv)

wherein $A^{11}$, $A^{12}$, $A^{13}$ and $A^{14}$ are, the same or different, $-(-CH_2)_p-$ and p is an integer of 0 to 3;

$X^{11}$, $X^{12}$, $X^{13}$ and $X^{14}$ are, the same or different, a methyl group, an ethyl group, a propyl group or a butyl group; and a, b, c and d are an integer of 1 to 50,

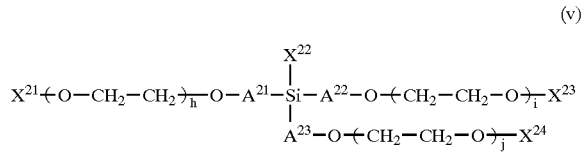  (v)

wherein $A^{21}$, $A^{22}$ and $A^{23}$ are, the same or different, $-(-CH_2)_p-$, provided that p is an integer of 0 to 3;

$X^{21}$, $X^{22}$, $X^{23}$ and $X^{24}$ are, the same or different, a methyl group, an ethyl group, a propyl group or a butyl group; and h, i and j are an integer of 1 to 50,

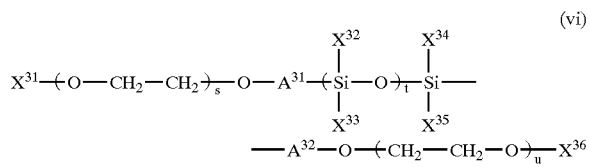  (vi)

wherein $A^{31}$ and $A^{32}$ are, the same or different, $-(-CH_2)_p-$, provided that p is an integer of 0 to 3;

$X^{31}$, $X^{32}$, $X^{33}$, $X^{34}$, $X^{35}$ and $X^{36}$ are, the same or different, a methyl group, an ethyl group, a propyl group or a butyl group; and s and u are an integer of 1 to 50, t is an integer of 0 to 10, t<s and t<u.

2. The electrolyte composition according to claim 1, wherein the reactive functional group in the crosslinkable structural unit is (a) a reactive silicon group, (b) a methylepoxy group, (c) an ethylenically unsaturated group, or (d) a halogen atom.

3. The electrolyte composition according to claim 1, wherein the polymer (1) having the ether linkage has the weight-average molecular weight of $10^5$ to $10^7$.

4. The electrolyte composition according to claim 1, wherein the electrolyte salt compound is a lithium salt compound.

5. The electrolyte composition according to claim 1, which contains a crosslinked polymer obtained by crosslinking the polymer (1) by utilizing the reactivity of a crosslinkable structural unit in the polymer (1).

6. A battery comprising the electrolyte composition according to claim 1, a positive electrode, and a negative electrode.

7. The electrolyte composition according to claim 2, wherein the polymer (1) having the ether linkage has the weight-average molecular weight of $10^5$ to $10^7$.

8. The electrolyte composition according to claim 2, wherein the electrolyte salt compound is a lithium salt compound.

9. The electrolyte composition according to claim 3, wherein the electrolyte salt compound is a lithium salt compound.

10. The electrolyte composition according to claim 2, which contains a crosslinked polymer obtained by crosslinking the polymer (1) by utilizing the reactivity of a crosslinkable structural unit in the polymer (1).

11. The electrolyte composition according to claim 3, which contains a crosslinked polymer obtained by crosslinking the polymer (1) by utilizing the reactivity of a crosslinkable structural unit in the polymer (1).

12. A battery comprising the electrolyte composition according to claim 2, a positive electrode, and a negative electrode.

13. A battery comprising the electrolyte composition according to claim 3, a positive electrode, and a negative electrode.

14. A battery comprising the electrolyte composition according to claim 4, a positive electrode, and a negative electrode.

15. A battery comprising the electrolyte composition according to claim 5, a positive electrode, and a negative electrode.

* * * * *